United States Patent
Blumenfeld et al.

(10) Patent No.: US 11,676,041 B2
(45) Date of Patent: Jun. 13, 2023

(54) SUPERVISORY LAYER FOR MODEL EXCHANGE

(71) Applicant: Clover Health, Jersey City, NJ (US)

(72) Inventors: Ian Blumenfeld, San Francisco, CA (US); David Wei Zhu, Hong Kong (HK)

(73) Assignee: Clover Health, Jersey City, NJ (US)

(*) Notice: Subject to any disclaimer, the term of this patent is extended or adjusted under 35 U.S.C. 154(b) by 536 days.

(21) Appl. No.: 16/828,801

(22) Filed: Mar. 24, 2020

(65) Prior Publication Data

US 2021/0304016 A1    Sep. 30, 2021

(51) Int. Cl.
*G06F 9/54* (2006.01)
*G06N 5/02* (2023.01)
*G06N 5/04* (2023.01)
*G06F 16/245* (2019.01)
*G06N 20/00* (2019.01)

(52) U.S. Cl.
CPC .............. *G06N 5/02* (2013.01); *G06F 9/541* (2013.01); *G06F 16/245* (2019.01); *G06N 5/04* (2013.01); *G06N 20/00* (2019.01)

(58) Field of Classification Search
CPC ............ G06N 5/02; G06N 5/04; G06N 20/00; G06N 5/003; G06N 20/10; G06F 9/541; G06F 16/245; G06F 9/547
See application file for complete search history.

(56) References Cited

U.S. PATENT DOCUMENTS

| | | | |
|---|---|---|---|
| 11,216,895 B1 * | 1/2022 | Schwartz | G06F 16/248 |
| 11,256,991 B2 * | 2/2022 | Gulin | G06N 20/20 |
| 2006/0129427 A1 * | 6/2006 | Wennberg | G06Q 10/00 703/2 |
| 2020/0104737 A1 * | 4/2020 | Abaci | G06N 20/20 |
| 2021/0279644 A1 * | 9/2021 | Givental | G06K 9/6259 |

* cited by examiner

*Primary Examiner* — Daxin Wu
(74) *Attorney, Agent, or Firm* — Lee & Hayes, P.C.

(57) ABSTRACT

Systems and methods for models utilizing siloed data are disclosed. For example, data stored with and/or available to one or more systems may be siloed such that it may not be aggregated and/or shared with other systems. The presently-disclosed systems and methods utilize predictive layers and models to allow each system to predict outcomes using its own data and then models are shared between systems to allow each associated system to gain the benefits of the data of other systems without aggregating such data or otherwise sharing the data.

20 Claims, 9 Drawing Sheets

800 ─╮

```
┌─────────────────────────────────────────────────────────────────┐
│ Store account data associated with multiple remote systems,    │
│ the account data indicating at least one of: data types         │
│ associated with the remote systems; predictive layers           │
│ associated with the remote systems; or data constraints         │
│ associated with the remote systems                              │
│                              802                                │
└─────────────────────────────────────────────────────────────────┘
                                │
                                ▼
┌─────────────────────────────────────────────────────────────────┐
│ Receive, from a remote system, a request to utilize a model    │
│ with a predictive layer                                         │
│                              804                                │
└─────────────────────────────────────────────────────────────────┘
                                │
                                ▼
┌─────────────────────────────────────────────────────────────────┐
│ Determine a condition to account for in association with        │
│ providing the model to the remote system, the factor            │
│ including at least one of: a change in a degree of a            │
│ confidence score associated with an outcome predicted by        │
│ the predictive layer utilizing the model; or a data type        │
│ associated with the model corresponding to a data type          │
│ associated with the predictive layer                            │
│                              806                                │
└─────────────────────────────────────────────────────────────────┘
                                │
                                ▼
┌─────────────────────────────────────────────────────────────────┐
│ Send the model to the remote system based at least in part      │
│ on the condition being satisfied                                │
│                              808                                │
└─────────────────────────────────────────────────────────────────┘
```

FIG. 8

SUPERVISORY LAYER FOR MODEL EXCHANGE

BACKGROUND

Data from disparate sources may typically be aggregated and used. In some instances, data may be siloed and may not be aggregated with other data. Means to utilize siloed data without sharing the data may be desired. Described herein are improvements in technology and solutions to technical problems that can be used to, among other things, increase the availability and use of siloed data without sharing the data.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 8 illustrates a flow diagram of an example process supervising model exchange.

DETAILED DESCRIPTION

Figure 1:
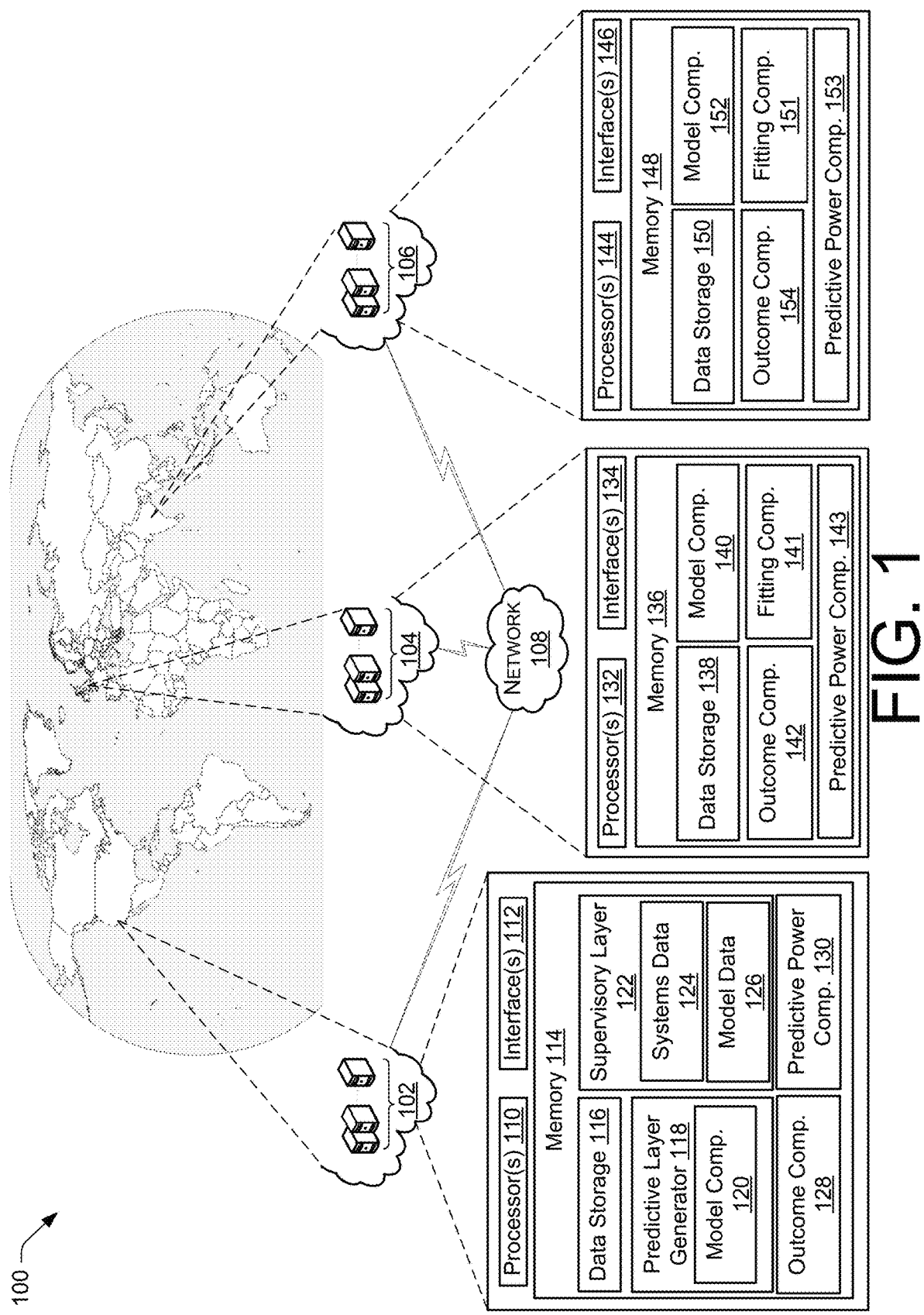
FIG. 1 illustrates a schematic diagram of an example environment for supervising model exchange in order to share siloed data.

Systems and methods for analyzing systems and determining models to exchange siloed data are described herein. As multiple models are created for multiple systems, a supervisory layer, which may be stored on one of the systems or may be stored on a remote computing device, may store account data associated with each of the systems (e.g., a first system and a second system) that the supervisory layer uses to determine which system should utilize which model in order to increase the ability and/or accuracy of predicting a given outcome. Take, for example, multiple systems that store or otherwise access stored data. Each system may utilize its own data to, for example, predict desired or undesired outcomes. Also, if permitted and desired, the systems may agree to share data such that a given system may use its own data as well as data from other systems to predict outcomes. However, in some examples, data sharing between systems may be prohibited and/or not desired. For example, some governments enact laws and/or regulations that proscribe the sharing of data, such as the sharing of data across country boarders, across state/territory boarders, and/or across company servers. In examples, firewalls may be setup and/or utilized that prevent the sharing of such data. Additionally, or alternatively, given the increased attention data sharing has garnered, companies and/or other entities may desire to silo their data even in the absence of government proscriptions. In these and other examples, the need arises to utilize siloed data without actually sending and/or receiving such data between systems as well as determining which systems will benefit from using said data.

The present innovation is directed to systems and methods that utilize generated models to use siloed data in a way that allows participating systems to gain the benefits of the models based on a determination that a particular system should use a particular model. By way of example, a first system and a second system may have siloed data but may desire to utilize each other's data to increase the ability and/or accuracy of predicting a given outcome. For example, the first and second systems may be entities that store and/or have access to health-related information of a number of members. The first and second system may be interested in predicting a certain health-related outcome, such as, for example, a likelihood that a member will be hospitalized.

In the example utilized above, the first system may have access to health-related data associated with its members and the second system may have access to different health-related data associated with its members. On their own, the first system and the second system could utilize their own data to predict a likelihood that a given member and/or set of members will be hospitalized. However, if both systems were able to utilize each other's data, the data sample size would increase and/or different categories of data (e.g., blood pressure, age, medical conditions, living conditions, etc.) would be available to the two systems, which may increase the accuracy of predicting the outcome. To utilize the siloed data from the first and second systems, one or more models may be generated and transmitted. In order to determine that the one or more models will increase the accuracy of predicting the outcome, a supervisory layer may store account data for multiple systems indicating information associated with each system (e.g., data types associated with the remote systems; predictive layers associated with the remote systems; or data constraints associated with the remote systems, etc.).

For example, the first system may have access to data of a first data type and data of a second data type. The first system may be configured to generate a first predictive layer that is fit to receive the data of the first and second data types and utilize that data to predict an outcome. The second system may have access to its own data, which may be of the first data type and of a third data type, for example. The first system may be configured to generate a second predictive layer that is fit to receive the second system's data types, and in this example, the first system may send the second predictive layer to the second system. The second system may then utilize the second predictive layer to predict the outcome. However, in this example, the first and second systems have a shared data type, namely the first data type. As such, both systems would benefit from utilizing the data each system has that is associated with the first data type.

To utilize such data, the first system may generate a first model that is fit to receive the second system's data associated with the first data type. The first model may be sent from the first system to the second system as a feature configured as an input to the second predictive layer. By so doing, the second system may now utilize its own data of the first data type and the third data type as well as the feature from the first system. Additionally, or alternatively, the second system may generate a second model that is fit to receive the first system's data associated with the first data type. The second model may be sent from the second system to the first system as another feature configured as an input to the first predictive layer. By so doing, the first system may now utilize its own data of the first data type and the second data type as well as the feature from the second system. The generation and use of models, as described herein, allows for each system to benefit from the siloed data of other associated systems without having to send and/or aggregate such siloed data.

As multiple models are created for multiple systems, a supervisory layer, which may be stored on one of the systems or may be stored on a remote computing device, may store account data associated with each of the systems (e.g., the first system and the second system) that the supervisory layer uses to determine which system should utilize which model in order to increase the ability and/or accuracy of predicting a given outcome. For example, the supervisory layer may store which data type's and/or features are associated with each predictive layer of a given system as well as which data type's and/or features are associated with each model that is generated. In one example, the supervisory layer may store a first model associated with a first system that utilizes a first type of data and a second type of data as inputs in order to generate an outcome. The supervisory layer may determine that a second system utilizes a predictive layer that also utilizes the first type of data and the second type of data to generate an outcome. The supervisory layer may determine that, due to the similarities in the types of data, that including the model into the predictive layer of the second system would increase the ability and/or accuracy of predicting a given outcome and the supervisory layer may provide the model to the predictive layer of the second system.

In some cases, the supervisory layer may determine a change in a degree of a confidence score associated with an outcome occurring based at least in part on utilizing the model as an input to the predictive layer of the second system. For example, in some instances, the supervisory layer may utilize a machine learning model to determine if including the model into the predictive layer of the second system would increase the ability and/or accuracy of predicting a given outcome. For example, an outcome based off a first type of data and a second type of data may result in an 85% confidence score of the outcome, via a machine learning model. The supervisory layer may determine that including the model, or a feature generated by the model, as an input into the predictive layer along with the first type of data and the second type of data results in a 90% confidence score of the outcome (i.e., the model and/or feature included in the input improved the confidence score of the outcome). In this case, the supervisory layer may send the model to the second system in response to determining that including the model and/or feature generated by the model improves the confidence score of the outcome. In another example, supervisory layer may determine that including the model, or a feature generated by the model, as an input into the predictive layer along with the first type of data and the second type of data results in a 50% confidence score of the outcome (i.e., the model and/or feature included in the input worsened the confidence score of the outcome). In this case, the supervisory layer may determine to not send the model to the second system in response to determining that including the model and/or feature generated by the model does not improve the confidence score of the outcome.

By way of additional example, a third system may also desire to utilize the siloed data of the first and second systems, and the first and second systems may desire to utilize the siloed data of the third system. In these examples where three or more systems are involved, a predictive layer may be generated for each system. Each of the predictive layers may be fit to utilize data of the data types associated with the system for which the predictive layer was generated. Additionally, each system may be configured to generate a model for one or more of the other associated systems. For example, the first system may be configured to generate a model for the second system and another model for the third system; the second system may be configured to generate a model for the first system and another model for the third system; and the third system may be configured to generate a model for the first system and another model for the second system. Each of these models may be fit to utilize data types that are common between the sending system and the receiving system. The supervisory layer may store information indicating which systems are associated with varying data types to determine how the models should be fit. Additionally, the supervisory layer may store information indicating associations between systems. The information from the supervisory layer may be utilized to determine which systems should receive which models and how those models should be fit.

The models may be sent to their respective systems as features configured to be input into the predictive layer of a given system. In this way, each of the systems may utilize their own data and may also utilize the models generated by the other associated systems as additional input to predict an outcome. As additional systems are associated with the existing systems, requests for models may be transmitted to other associated systems and/or to the supervisory layer and models may be transmitted to and from the newly-associated system once the supervisory layer determines which model(s) the system should receive. By so doing, each associated system may utilize effective siloed data from the other systems without transferring such data and/or aggregating such data.

Additionally, or alternatively, one or more of the predictive layers and/or models described herein may be fit based at least in part on historical data. For example, once an outcome is selected to be predicted, the supervisory layer may utilize historical data indicating what data and/or data types may be relevant to predicting the outcome may utilized. The predictive layers and/or models may be modified and/or otherwise configured, based at least in part on the historical data, to utilize the data and/or data types relevant to the outcome to predict the outcome.

Additionally, or alternatively, the systems described herein may be associated with different languages. For example, the first system may be associated with the English language while the second system may be associated with the Spanish language. A mapping may be performed between words and/or phrases of the first system and the second system such that both systems be communicate with each other and such that a determination of which data types are common to the two systems may be made.

Additionally, or alternatively, the systems and methods described herein may be configured to determine that a given data type is more important and/or useful for predicting a given outcome than one or more other data types. For example, the addition of a given data type may increase the predictive power of the predictive layer and/or the removal of a given data type may decrease the predictive power of the predictive layer. In these examples, data may be generated that indicates the importance of the given data type. Communications may be sent to associated systems indicating the importance of the given data type, and for systems that are not associated with the data type (e.g., systems that do not collect such information or that have not been configured to analyze such information), they may be configured or reconfigured to collect and/or utilize the data type. By so doing, the predictive power of the predictive layers of those systems may be improved. Additionally, or alternatively, a given data type that is determined to be relatively unimportant may be noted and a communication may be sent to associated systems indicating that collection and/or use of data of that data type may cease and/or may not be used by the predictive layers of those systems. Additionally, or alternatively, a given system may generate results and/or models that are more useful than results and/or models generated by other systems. The relative importance of a given system to other associated systems may be determined and may be utilized to weight results and/or acquire additional participation by additional systems.

Additionally, or alternatively, the systems and methods described herein may be configured to provide the one or more systems with models via one or more application programming interfaces (APIs). For example, the supervisory layer may provide a model to the first system and a device associated with the first system may present information associated with the model via an API. In some cases, the information may be based on a relevancy of the information to the first system. For example, the information may include health care type data and the API may present health care type data that is relevant to the first system based on the health care type data that the first system is historically associated with.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example environment 100 for models utilizing siloed data. The environment 100 may include, for example, a first system 102, a second system, 104, and a third system 106. It should be understood that while FIG. 1 depicts three systems, the environment 100 may include two systems, three systems, or more than three systems. It should also be understood that while the objects are described as "systems," those objects may be considered devices. In examples, each of the systems 102, 104, 106 may be located in different locations. As shown in FIG. 1, for example, the first system 102 is located in the United States, the second system 104 is located in England, and the third system 106 is located in India. It should be understood that the systems described herein may be located in any location, and the locations depicted and described herein are by way of illustration only. Additionally, or alternatively, the systems may be located in the same location (e.g., the same address), but may be otherwise physically and/or digitally separated from each other, such as via firewalls. The systems 102, 104, 106 may be configured to communicate with each other via a network 108. The components of the systems 102, 104, 106 will be described in detail below.

For example, the first system 102 may include one or more processors 110, one or more network interfaces 112, and memory 114. The memory 114 may include one or more components, such as, for example, a data storage component 116, a predictive layer generator 118 (which may include a model component 120), a supervisory layer 122, a systems data layer 124, a model data layer 126, an outcome component 128, and/or a predictive power component 130. Each of the components of the memory 114 will be described below.

The data storage component 116 may be configured to store and/or access data associated with the first system 102. The data may be any data associated with the first system 102. In examples, the data may be siloed data. As used herein, "siloed data" includes data that is subject to laws, regulations, policies, and/or other restrictions and/or proscriptions that prevents, restricts, and/or proscribes sharing of that data with other systems, entities, and/or countries. Health-related data is used throughout this disclosure as an example of siloed data. However, it should be understood that the use of health-related data is by way of illustration only and not by way of limitation. In examples, the data stored by and/or accessible to a given system in the environment 100 may not be siloed. As such, some data may be siloed while other data may not be siloed. Alternatively, none of the data may be siloed but data aggregation may not be desired. The data storage component 116 may be utilized by one or more other components of the first system 102 to, for example, predict an outcome.

The predictive layer generator 118 may be configured to generate one or more predictive layers. A predictive layer may include one or more models that utilize predictive analytics to predict one or more outcomes. Predictive analytic techniques may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the layers and/or models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases, such as for example the data storage 116, and may be utilized to predict trends and behavior patterns. In examples, the event, otherwise described herein as an outcome, may be an event that will occur in the future, such as whether a member will be hospitalized, a likelihood of a member being diagnosed with diabetes, a likelihood of a member missing a medication prescription fill at a pharmacy, etc. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis, such as from the data storage 116.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter predictive modelling may be performed to generate accurate predictive models for future events. By so doing, the predictive layer generator 118 may utilize data from the data storage 116, as well as features from other systems as described herein, to predict or otherwise determine an outcome. Outcome prediction may be deterministic such that the outcome is determined to occur or not occur. Additionally, or alternatively, the outcome prediction may be probabilistic such that the outcome is determined to occur to a certain probability and/or confidence.

The first system 102 may generate predictive layers, via the predictive layer generator 118, based at least in part on at least one of the data to be utilized by the predictive layer, the data type of the data to be utilized by the predictive layer, the outcome selected to be predicted, and/or one or more specifications of the system indicated to utilize the predictive layer. Once generated, the predictive layer may be packaged and/or formatted such that it may be transmitted and/or utilized by another system, such as the second system 104 and/or the third system 106. For example, the predictive layer may be packaged as a Docker image and may be transmitted to the second system 104 and/or the third system 106 in response to a pull request from the second system 104 and/or the third system 106. Additionally, or alternatively, the predictive layer may be pushed to the second system 104 and/or the third system 106 from the first system 102. The packaging may include operating-system-level virtualization, also described as containerization. Resource isolation features of the Linux kernel such as cgroups and kernel namespaces, and a union-capable file system, may be utilized to allow independent containers to run within a Linux instance, which may allow for operations without the use of virtual machines. In other examples, virtual machines may be generated and/or utilized. One or more application programming interfaces (APIs) may be included and may be utilized by a system to predict outcomes with the predictive layer.

The supervisory layer 122 may be configured to determine which system should utilize which model in order to increase the ability and/or accuracy of predicting a given outcome. For example, the supervisory layer 122 may store which data type's and/or features are associated with each predictive layer of a given system via the systems data 124 as well as which data type's and/or features are associated with each model that is generated via the model data 126. In one example, the supervisory layer 122 may store a first model associated with a first system that utilizes a first type of data and a second type of data as inputs in order to generate an outcome. The supervisory layer 122 may determine that a second system utilizes a predictive layer that also utilizes the first type of data and the second type of data to generate an outcome. The supervisory layer 122 may determine that, due to the similarities in the types of data, that including the model into the predictive layer of the second system would increase the ability and/or accuracy of predicting a given outcome and the supervisory layer 122 may provide the model to the predictive layer of the second system. In some examples, the supervisory layer 122 may operate as a rules engine, a model, and/or a machine-learning model. In some cases, the supervisory layer 122 may include a graphical user interface (GUI) that displays selectable information associated with processes discussed herein.

In some examples, the supervisory layer 122 may be configured to provide one or more systems with models via one or more application programming interfaces (APIs). For example, the supervisory layer 122 may provide a model to the second system and a device associated with the second system may present information associated with the model via an API. In some cases, the information may be based on a relevancy of the information to the second system. For example, the information may include health care type data and the API may present health care type data that is relevant to the second system based on the health care type data that the second system is historically associated with. In some examples, the supervisory layer 122 may receive an indication of, or otherwise have access to, databases storing data associated with the remote systems and the supervisory layer 122 may generate APIs associated with each model and that pull data from the databases storing the data associated with the remote systems. In this way, the APIs can be provided to the remote systems and display relevant information.

The outcome component 128 may be configured to utilize the generated predictive layer to predict the selected outcome. For example, data available to the system running the predictive layer may be retrieved and input into the predictive layer. The outcome component 128 may run the one or more models associated with the predictive layer to determine the selected outcome. In examples, the outcome may be deterministic or probabilistic, as described herein.

The model component 120 of the predictive layer generator 118 may be configured to generate models for other systems. As used herein, "models" may be the same as or similar to predictive layers and/or may include the same or similar functionality. Models, as described herein, may be generated and/or utilized when three or more systems are associated, as will be described in more detail below. Models may be generated in response to a request for a model from another system. In some cases, models may be generated and stored in the model data 126 and the supervisory layer 122 may provide the models to other systems. Using FIG. 1 as an example, the second system 104 and the third system 106 may request a model from the first system 102. The request, and/or other information available to the first system 102, may indicate the data and/or data types to be utilized by the second system 104 and by the third system 106.

A model stored in the model data 126 for the second system 104 may be selected by the supervisory layer 122 based at least in part on overlapping data types between the model and the second system 104. For example, the systems data 124 may store information indicating which data types are available to the systems. Using the systems data 124, a determination may be made as to the data types available to the second system 104 that are also utilized by the model. A model configured to utilize data of the overlapping data types may be selected from the model data 126. In examples, the model may be utilized to predict the outcome using the data of the first system 102.

The result of that analysis may include a determination of the outcome and/or one or more serialized models and/or log files. Serialized models may include translated data structures and/or object states in a format that can be stored and/or transmitted for reconstruction by the receiving system. The serialized object may include a coefficient mapping for common data types between systems as well as a resource configured to allow the receiving system to utilize the coefficient mapping with respect to its data of the common data types. Log files include indications of events that occur in an operating system, such as the resulting prediction from the first system 102 running the model. In examples, the model may be formatted as a feature configured as an input to a predictive model of the system utilizing the model. The feature may be an individual measurable property or characteristic of the observed outcome. The feature may be numeric and/or may include one or more strings and/or graphs. In examples, the feature may correspond to an explanatory variable, such as when statistical techniques are utilized when generating and/or utilizing predictive models. The features may be utilized as inputs by the predictive models of each system to predict the outcome, as described herein.

Models may be generated by some or all of the systems of the environment 100. For example, the first system 102 may include its model component 120, the second system 104 may include its model component 140, and/or the third system 106 may include its model component 152. The model component 140 of the second system 104 and/or the model component 152 of the third system 106 may include the same or similar components as the model component 120 of the first system 102 and/or may perform the same or similar operations.

The model data 126 may be configured to store models and information associated with the models. For example, models may be generated at the first system 102 and/or may be received from other systems, such as the second system 104 and the third system 106. Each model may be associated with certain data types and/or certain outcomes. The model data 126 may store the models as well as the data type that each model is associated with and/or the system that generated the model. In examples, the model data 126 may be a separate component from the system data 124. In other examples, the model data 126 and the system data 124 may be parts of the same component, which may be described as the supervisory layer 122.

The predictive power component 130 may be configured to determine a change in the predicted outcome, such as, for example, an increase or decrease in a probability of the outcome occurring, based on utilizing a feature from a model. For example, some features may have a large impact on determining the outcome based at least in part on the amount of data available to the system running the model, the accuracy of the model, etc. When determining if certain systems should utilize a particular model, the supervisory layer 122 may be configured to utilize the predictive power component 130 to determine an amount of change of the probability of the outcome occurring based at least in part on utilizing the feature as an input. In examples, when the amount of change is greater than a threshold amount, such as, for example, a 1% increase, the feature may be utilized as an input for the predictive model of the particular system. In other examples where the amount of change is less than the threshold amount, the feature may be disregarded. In still other examples, the feature may result in a negative change to the outcome probability, and in these examples, the feature may be disregarded.

The predictive power component 130 may be additionally, or alternatively, configured to determine one or more data types that impact the outcome probability and an amount of such impact. For example, when determining if certain systems should utilize a particular model, the supervisory layer 122 may be configured to utilize the predictive power component 130 to determine that a first data type impacts the outcome probability greatly while a second data type has little impact on the outcome probability. In these examples, the predictive power component 130 may determine that the first data type impacts the outcome probability by at least a threshold amount, for example by 1%. A directive may then be generated and/or sent to systems that do not currently acquire data of the first type. The directive may request that the system initiate acquisition of such data to increase the accuracy of outcome determination. In other examples, a determination may be made that an instance of the outcome without using a particular data type results in a determined confidence within a threshold confidence range of another instance of the outcome that does use the particular data type. In these examples, the particular data type may be determined to be not of importance to determining the outcome, and the data associated with the data type may be removed from the system and/or may not be utilized by the system to predict the outcome. By so doing, computing resources are saved in that data that is less meaningful to determining the outcome is not utilized and/or is discarded.

The second system 104 may include components that may be the same as or similar to the components of the first system 102. The second system 104 may or may not include a supervisory layer, such as supervisory layer 122. For example, the second system 104 may include one or more processors 132, one or more interfaces 134, and memory 136. Each of these components may function in the same or a similar manner from the one or more processors 110, the one or more interfaces 112, and/or memory 114 of the first system 102. The memory 136 of the second system 104 may include components such as, for example, a data storage component 138, a model component 140, an outcome component 142, a fitting component 141, and/or a predictive power component 143. These components may function in the same or a similar manner to the data storage 116, predictive layer generator 118, model component 120, outcome component 128, and/or predictive power component 130 of the first system 102. For example, the data storage 138 may store or otherwise access data associated with and/or available to the second system 104. The predictive layer generator 118 may generate predictive layers associated with the second system 104. The model component 140 may generate models requested from other systems. The outcome component 142 may utilize one or more predictive layers and features generated from models from other systems to determine a selected outcome.

The third system 106 may include components that may be the same as or similar to the components of the first system 102. For example, the third system 106 may include one or more processors 144, one or more interfaces 146, and memory 148. Each of these components may function in the same or a similar manner from the one or more processors 110, the one or more interfaces 112, and/or memory 114 of the first system 102. The memory 148 of the third system 106 may include components such as, for example, a data storage component 150, a model component 152, an outcome component 154, a fitting component 151, and/or a predictive power component 153. These components may function in the same or a similar manner to the data storage 116, predictive layer generator 118, model component 120, outcome component 128, and/or predictive power component 130 of the first system 102. For example, the data storage 150 may store or otherwise access data associated with and/or available to the third system 106. The model component 152 may generate models requested from other systems. The outcome component 154 may utilize one or more predictive layers and features generated from models from other systems to determine a selected outcome.

While certain components are illustrated and described above as specific to a given system, such as the first system 102, it should be understood that some or all of the components may be associated with one or more of the other systems, such as the second system 104 and/or the third system 106. Additionally, operations performed by the processors 110 of the first system 102 may also, or alternatively, be performed by one or more of the processors 132 of the second system 104 and/or one or more of the processors 144 of the third system 106.

As used herein, a processor, such as processor(s) 110, 132, and/or 144, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 110, 132, and/or 144 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 110, 132, and/or 144 may possess its own local memory, which also may store program components, program data, and/or one or more operating systems.

The memory 114, 136, and/or 148 may include volatile and nonvolatile memory, removable and non-removable media implemented in any method or technology for storage of information, such as computer-readable instructions, data structures, program component, or other data. Such memory 114, 136, and/or 148 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 114, 136, and/or 148 may be implemented as computer-readable storage media ("CRSM"), which may be any available physical media accessible by the processor(s) 104 and/or 130 to execute instructions stored on the memory 114, 136, and/or 148. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 114, 136, and/or 148, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 112, 134, and/or 146 may enable communications between the components and/or devices shown in environment 100 and/or with one or more other remote systems, as well as other networked devices. Such network interface(s) 112, 134, and/or 146 may include one or more network interface controllers (NICs) or other types of transceiver devices to send and receive communications over the network 108.

For instance, each of the network interface(s) 112, 134, and/or 146 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 112, 134, and/or 146 may include a wide area network (WAN) component to enable communication over a wide area network.

Figure 2:
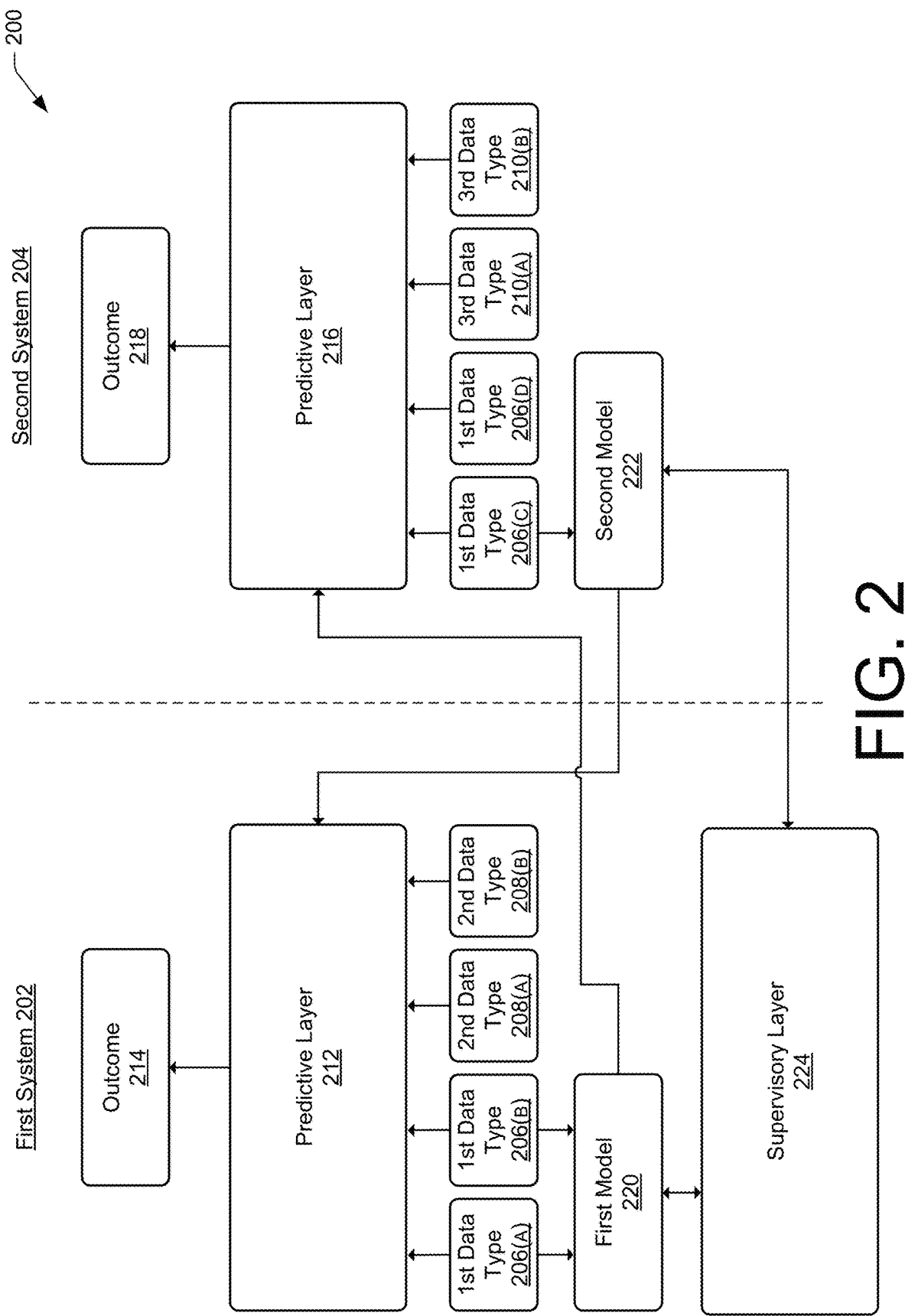
FIG. 2 illustrates a conceptual diagram of example components of two systems storing siloed and/or sharable data.

FIG. 2 illustrates a conceptual diagram of example components and data of two systems storing siloed and/or sharable data. The environment 200 depicted in FIG. 2 shows a first system 202 and a second system 204. The first system 202 may include the same or similar components and perform the same or similar operations as the first system 102 from FIG. 1. The second system 204 may include the same or similar components and perform the same or similar operations as the second system 104 and/or the third system 106 from FIG. 1.

With respect to the first system 202, it may include and/or have access to data of various data types. As shown in FIG. 2, the data may include data of a first data type 206(*a*)-(*b*) and data of a second data type 208(*a*)-(*b*). With respect to the second system 204, it may include and/or have access to data of the first data type 206(*c*)-(*d*) and data of a third data type 210(*a*)-(*b*). In the example described with respect to FIG. 2, the data accessible to the first system 202 may be different from the data accessible to the second system 204. For example, the first system 202 may have data related to a first set of patients (otherwise referred to as members) while the second system 204 may have data related to a second set of members. That data may be of data types such as, for example, blood pressure, age, weight, body-mass index, diagnosed conditions, etc. Thus, while both systems have data related to different members, both systems may have data of the same type, shown in FIG. 2 as the first data type 206(*a*)-(*d*). Additionally, both systems may have data of different types, shown in FIG. 2 as the second data type 208(*a*)-(*b*) for the first system 202 and the third data type 210(*a*)-(*b*) for the second system 204.

The first system 202 may also include a predictive layer 212 that may be fit to receive the data of the first data type 206(a)-(b) and the data of the second data type 208(a)-(b) and utilize that data to predict Outcome A 214. The first system 202 may be configured to generate a second predictive layer 216 that is fit to receive the second system's 204 data types 206(c)-(d) and 210(a)-(b), and the first system 202 may send the second predictive layer 216 to the second system 204. The second system 204 may then utilize the second predictive layer 216 to predict Outcome B 218. In this example, the first system 202 utilizes its own data to generate Outcome A 214, and the second system 204 utilizes its own data to generate Outcome B 218, but the first system 202 does not utilize the data from the second system 204, or vice versa. However, both systems would benefit from utilizing the data each system has that is associated with a common data type, here illustrated as the first data type 206(a)-(d). It should be understood that Outcome A and Outcome B may be the same outcome or different outcomes.

To utilize such data, the first system 202 may generate a model, illustrated as the first model 220, that is fit to receive the second system's 204 data associated with the first data type 206(c)-(d). The first model 220 may be sent from the first system 202 to the second system 204 as a feature configured as an input to the second predictive layer 216, as described above with respect to FIG. 1, for example. By so doing, the second system 204 may now utilize its own data of the first data type 206(c)-(d) and the third data type 210(a)-(b) as well as the feature from the first system 202.

Additionally, or alternatively, the second system 204 may generate a second model 222, illustrated as the second model 222, that is fit to receive the first system's 202 data associated with the first data type 206(a)-(b) and data associated with the second data type 208(a)-(b). The second model 222 may be sent from the second system 204 to the first system 202 as another feature configured as an input to the first predictive layer 212. By so doing, the first system 202 may now utilize its own data of the first data type 206(a)-(b) and the second data type 208(a)-(b) as well as the feature from the second system 204. The generation and use of predictive layers and models, as described herein, allows for each system to benefit from the siloed data of other associated systems without having to send and/or aggregate such siloed data.

As models are generated between systems, a supervisory layer 224 may store the models, such as the first model 220 and the second model 222 as well as the types of data associated with each model. For example, the supervisory layer 224 may store the first model 220 and data indicating that the first model 220 was generated by the first system 202 and data types associated with the first system 202. Additionally, the supervisory layer 224 may store the second model 222 and data indicating that the second model 222 was generated by the second system 204 and data types associated with the second system 204.

Use of features between the first system 202 and the second system 204 may include ensembling at least one of the features with the predictive layers of the systems. The ensembling may include combining two or more algorithms associated with the predictive layers to allow for incorporation of predictions from each of the algorithms. The ensembling may include, for example, techniques such as averaging, majority-vote methods, weighted-average methods, bootstrap aggregation, boosting, and/or stacking.

Figure 3:
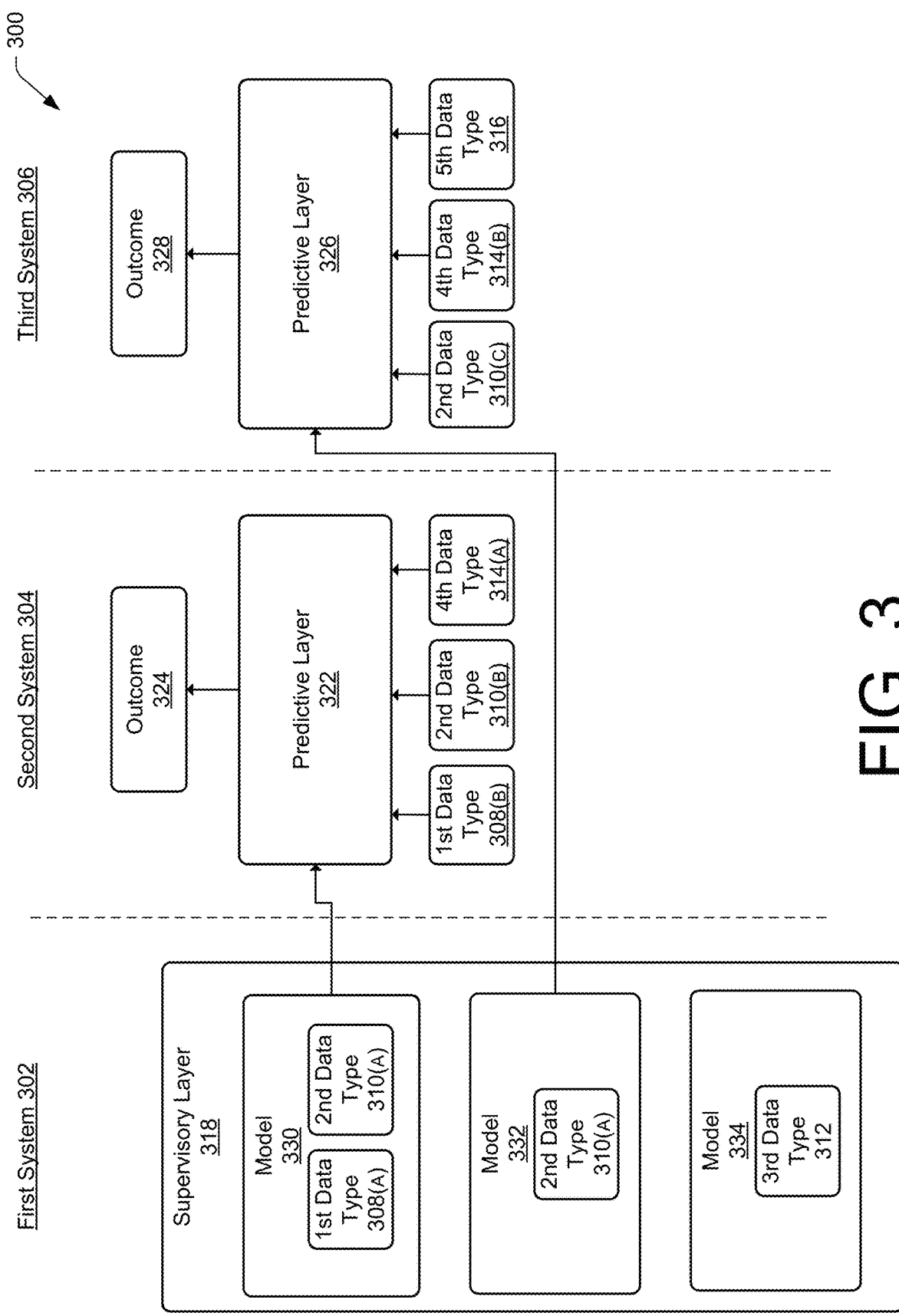
FIG. 3 illustrates a conceptual diagram of example components of multiple systems storing siloed and/or sharable data.

FIG. 3 illustrates a conceptual diagram of example components and data of multiple systems storing siloed and/or sharable data. The environment 300 depicted in FIG. 3 shows a first system 302, a second system 304, and a third system 306. The first system 302 may include the same or similar components and perform the same or similar operations as the first system 102 from FIG. 1. The second system 304 may include the same or similar components and perform the same or similar operations as the second system 104 from FIG. 1. The third system 306 may include the same or similar components and perform the same or similar operations as the third system 106 from FIG. 1.

With respect to the first system 302, it may include and/or have access to data of various data types. As shown in FIG. 3, the first system may include a supervisory layer 318 that stores a plurality of models, such as model 330, model 332, and model 334. The data associated with each of the plurality of models may include data of a first data type 308(a), data of a second data type 310(a), and data of a third type 312. With respect to the second system 304, it may include and/or have access to data of the first data type 308(b), data of the second data type 310(b), and data of a fourth data type 314(a). With respect to the third system 306, it may include and/or have access to data of the second data type 310(c), data of the fourth data type 314(b), and data of a fifth data type 316. In the example described with respect to FIG. 3, the data accessible to the first system 302 via the supervisory layer 318 may be different from the data accessible to the second system 304 and/or the third system 306. For example, the first system 302 may have data related to a first set of members, the second system 304 may have data related to a second set of members, and the third system 306 may have data related to a third set of members. That data may be of data types such as, for example, blood pressure, age, weight, body-mass index, diagnosed conditions, etc. Thus, while all three systems have data related to different members, each system may have data of the same type, shown in FIG. 3 as the second data type 310(a)-(c). Additionally, the systems may have data of different types, shown in FIG. 3 as the third data type 312 for the first system 302 and the fifth data type of the third system 306. Additionally, some systems may have overlapping data while others may not. For example, the first data type 308(a)-(b) overlaps with respect to the first system 302 and the second system 304, but not with respect to the third system 306.

As discussed above, to utilize data of common data types between systems, the systems may be configured to generate one or more models for sharing between the systems. A model component of each system may be configured to generate models for other systems. Models may be generated in response to a request for a model from another system. The request, and/or other information available to the first system 302, may indicate the data and/or data types to be utilized by the second system 304 and by the third system 306. Once a model is generated, the supervisory layer 318 may store the model and any information associated with the model (e.g., data types associated with the model, predictive layers associated with the system that generated the model, etc.) as well as information associated with each system (e.g., data types associated with each system, outcomes associated with predictive layers, data constraints associated with each system, etc.). As shown in FIG. 3, the supervisory layer 318 may store a model 330 that is associated with the first data type 308(a) and the second data type 310(a), a model 332 that is associated with the second data type 310(a), and a model 334 that is associated with the third data type 312.

In some cases, the first system 302 may receive a request for a model from the second system 304. The supervisory layer 318 of the first system 302 may determine that the model 330 may be fit for the predictive layer 322 of the second system 304 based at least in part on overlapping data types between the model 330 and the second system 304. For example, the supervisory layer 318 may store system data indicating which data types are available to the systems. Using the system data, a determination may be made as to the data types available to the second system 304 that are also associated with the model 330, here illustrated as the first data type 308(*a*)-(*b*) and the second data type 310(*a*)-(*b*). The model 330 configured to utilize data of the overlapping data types may be selected by the supervisory layer 318 to be provided to the predictive layer 322 of the second system 304. In examples, the supervisory layer 318 may utilize the model 330 to predict an outcome using the data of the second system 304 of the common data types.

The result of that analysis may include a determination of the outcome and/or one or more serialized models and/or log files. Serialized models may include translated data structures and/or object states in a format that can be stored and/or transmitted for reconstruction by the receiving system. The serialized object may include a coefficient mapping for common data types between systems as well as a resource configured to allow the receiving system to utilize the coefficient mapping with respect to its data of the common data types. Log files include indications of events that occur in an operating system, such as the resulting prediction from the second system 304 running the model 330. In examples, the model 330 may be formatted as a feature configured as an input to the predictive layer 322 of the second system 304. The feature may be an individual measurable property or characteristic of the observed outcome. The feature may be numeric and/or may include one or more strings and/or graphs. In examples, the feature may correspond to an explanatory variable, such as when statistical techniques are utilized when generating and/or utilizing predictive models. The features may be utilized as inputs by the predictive layer of each system to predict the outcome, as described herein.

In another example, the first system 302 may receive a request for a model from the third system 306. The supervisory layer 318 of the first system 302 may determine that the model 332 may be fit for the predictive layer 326 of the third system 306 based at least in part on overlapping data types between the model 332 and the third system 306. For example, the supervisory layer 318 may store system data indicating which data types are available to the systems. Using the system data, a determination may be made as to the data types available to the third system 306 that are also associated with the model 332, here illustrated as the second data type 310(*a*) and (*c*). The model 332 configured to utilize data of the overlapping data types may be selected by the supervisory layer 318 to be provided to the predictive layer 326 of the third system 306. In examples, the supervisory layer 318 may utilize the model 332 to predict an outcome using the data of the third system 306 of the common data types.

In some examples, the supervisory layer 318 may determine which model to provide the second system 304 or the third system 306 based on a confidence score of an outcome associated with the model and/or the feature generated by the model being used as an input in the predictive layer 322 and/or the predictive layer 326. For example, a predictive power component may be configured to determine a change in the predicted outcome, such as, for example, an increase or decrease in a probability of the outcome occurring, based on utilizing a feature from a model. For example, some features may have a large impact on determining the outcome based at least in part on the amount of data available to the system running the model, the accuracy of the model, etc. When determining if certain systems should utilize a particular model, the supervisory layer 318 may be configured to utilize the predictive power component to determine an amount of change of the probability of the outcome occurring based at least in part on utilizing the feature as an input. In examples, when the amount of change is greater than a threshold amount, such as, for example, a 1% increase, the feature may be utilized as an input for the predictive model of the particular system. In other examples where the amount of change is less than the threshold amount, the feature may be disregarded. In still other examples, the feature may result in a negative change to the outcome probability, and in these examples, the feature may be disregarded.

In some examples, the supervisory layer 318 may determine which models to send to the systems (e.g., the second system 304 and/or the third system 306) based on the countries at issue (e.g., the countries associated with a particular system), the company types (e.g., the companies associated with the system, the companies associated with the data, etc.), the type of outcomes to be predicted, software/hardware used by the remote systems, databases used by the remote systems, security measures in place with the remote systems, computer resources available to the remote systems, factors that may be determined by machine learning models, and/or feedback received from the remote systems. In some examples, once a model is determined to be of benefit to a remote system, the supervisory layer 318 may send a notification to the remote system indicating that a model is available to be utilized as an input for the predictive layer of the remote system.

In some examples, the supervisory layer 318 may be configured to store information indicating associations between systems. For example, systems data stored in the supervisory layer 318 may be configured to indicate that the first system 302 is associated with the second system 304, the first system 302 is associated with the third system 306, the second system 304 is associated with the first system 302, the second system 304 is associated with the third system 306, the third system 306 is associated with the first system 302, and/or the third system 306 is associated with the second system 304. The systems data may be utilized to determine which systems may utilize which models when a request for such models is received. The supervisory layer 318 may be additionally configured to determine a mapping between words and/or phrases in different languages. For example, the systems of the environment 300 may be configured to run based on different languages, such as English, Spanish, etc. A mapping between words and phrases may be generated and utilized to determine, for example, the overlap between data types available to each system and/or the outcome selected for prediction.

Figure 4:
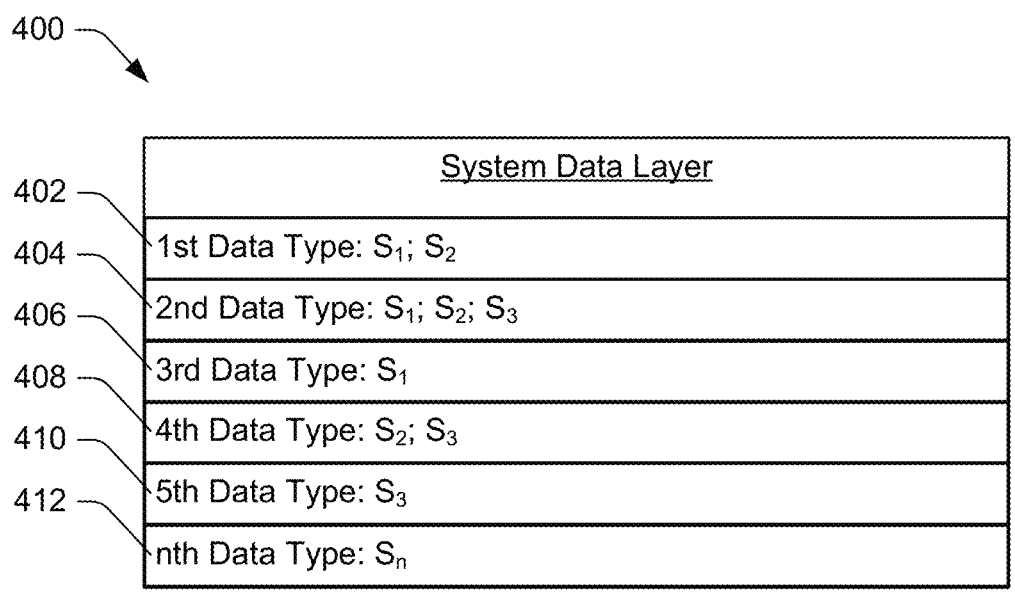
FIG. 4 illustrates a system data layer for data types associated with remote systems.

FIG. 4 illustrates a system data layer 400 for models utilizing siloed data. The system data layer 400 may be the same as or similar to the system data 124 from FIG. 1. The system data layer 400 may also perform the same or similar functions as the system data 124 from FIG. 1. For example, the system data layer 400 may include one or more databases that store and/or otherwise access information indicating data types associated with one or more associated systems. As described herein, multiple systems may be associated with each other and may be configured to communicate with each other. However, at least a portion of these systems may have siloed data that may not be shared with other systems. The systems and methods described herein may utilize predictive models to utilize such siloed data without sharing and/or aggregating data across systems.

In examples where three or more systems are associated, the system data layer 400 may be generated. The system data layer 400 may receive indications of the data types associated with the various associated systems and may store associations between those data types and the various systems. By way of example, and as illustrated in FIG. 4, the system data layer 400 may include a number of data-type entries 402-412 that list the data types and the systems associated therewith. For example, the first data-type entry 402 indicates that the first data type is associated with a first system and a second system; the second data-type entry 404 indicates that the second data type is associated with the first system, the second system, and the third system; the third data-type entry 406 indicates that the third data type is associated with the first system; the fourth data-type entry 408 indicates that the fourth data type is associated with the second system and the third system; the fifth data-type entry 410 indicates that the fifth data type is associated with the third system; and the nth data-type entry 412 indicates that the nth data type is associated with the nth system.

The system data layer 400 may be accessed by one or more components of the system to determine, for example, which models to provide various systems. As described above, models may be generated that are fit based on common data types associated with the sending and receiving systems and then stored by a supervisory layer. Using FIG. 4 as an example, a request from the second system for models will result in a model associated with the first system being selected by the supervisory layer that is fit to predict an outcome based on data of the first data type and the second data type in light of the information provided by the system data layer 400.

The system data layer 400 may be updated continuously and/or periodically and/or in response to an event occurring, such as adding a system and/or removing a system and/or a system indicating the addition or removal of a data type. Additionally, or alternatively, when a determination is made that a given system and/or data type does not positively effect prediction of outcomes, such as above a threshold level, the system data layer 400 may be updated to remove the entry associated with that data type. It should be understood that data types may have various nomenclature and/or may be expressed in multiple languages and/or abbreviations. For example, "blood pressure" may be expressed by some systems as "BP," "B.P.," and/or "presión sanguinea." The system data layer 400 and/or one or more other components of the system may be configured to associate nomenclatures, languages, and abbreviations.

Figure 5:
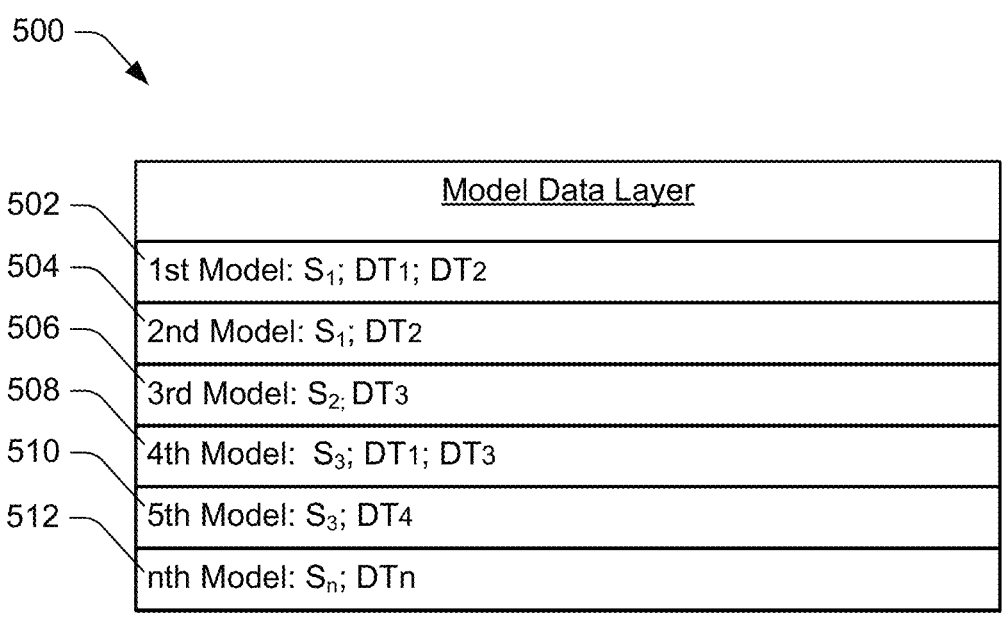
FIG. 5 illustrates a model data layer for models associated with data types and remote systems.

FIG. 5 illustrates a model data layer 500 for models utilizing siloed data. The model data layer 500 may be the same as or similar to the model data layer 126 from FIG. 1. The model data layer 500 may also perform the same or similar functions as the model data layer 126 from FIG. 1. For example, the model data layer 500 may include one or more databases that store and/or otherwise access information indicating which models are associated with which systems and which data types are associated with which models. Additionally, the model data layer 500 may store the models themselves. As described herein, multiple systems may be associated with each other and may be configured to communicate with each other. However, at least a portion of these systems may have siloed data that may not be shared with other systems. The systems and methods described herein may utilize models to utilize such siloed data without sharing and/or aggregating data across systems.

In examples where three or more systems are associated, the model data layer 500 may be generated. The model data layer may have one or more model entries 502-512 that may indicate a model that may be used as an input to a predictive layer for predicting an outcome. Using FIG. 5 as an example, the first model entry 502 may indicate that the first model is associated with a first system as well as a first data type and a second data type; the second model entry 504 may indicate that the second model is associated with the first system as well as the second data type; the third model entry 506 may indicate that the third model is associated with a second system as well as a third data type; the fourth model entry 508 may indicate that the fourth model is associated with a third system as well as the first data type and a third data type; the fifth model entry 510 may indicate that the fifth model is associated with the third system as well as a fourth data type; and the sixth model entry 512 may indicate that the nth model is associated with an nth system as well as an nth data type.

The model data layer 500 may be accessed by one or more components of the system to determine, for example, which systems should utilize which. The model data layer 500 may be updated continuously and/or periodically and/or in response to an event occurring, such as adding a system and/or removing system and/or a system indicating restrictions on sending and/or receiving models from other systems. Additionally, or alternatively, when a determination is made that a given system does not positively effect prediction of outcomes, such as above a threshold level, the model data layer 500 may be updated to remove the entry associated with that system.

Figure 6:
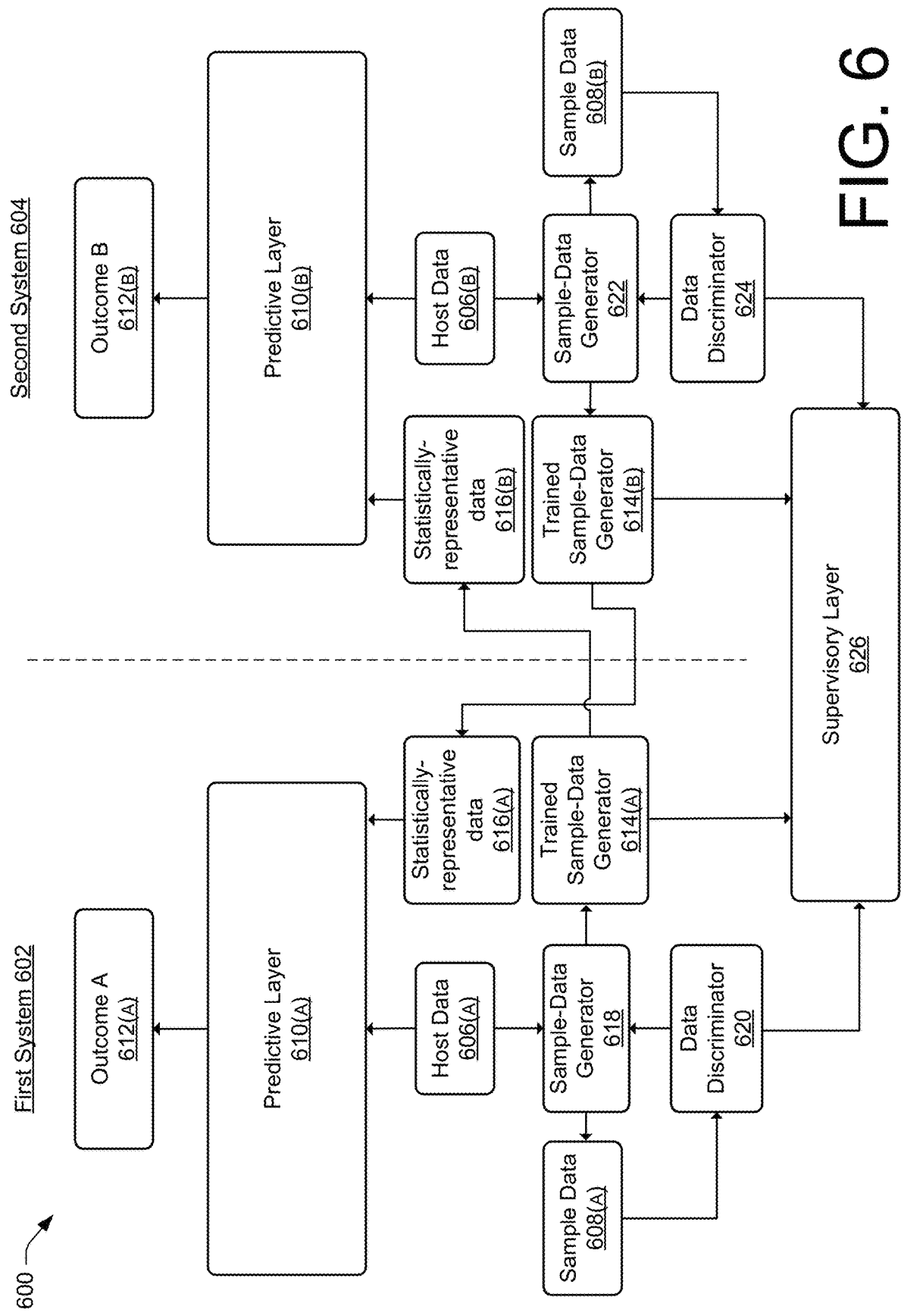
FIG. 6 illustrates a conceptual diagram of example components of two systems storing siloed and/or sharable data.

FIG. 6 illustrates a conceptual diagram of example components and data of two systems utilized for statistically-representative sample data generation. For example, in some cases, systems may utilize predictive layers to generate outcomes, as described herein, and may utilize statistically-representative sample data in a way that allows participating systems to gain the benefits of siloed data without that siloed data being transmitted in a proscribed and/or undesired way. By way of example, a first system and a second system may have siloed data but may desire to utilize each other's data to increase the ability and/or accuracy of predicting a given outcome. For example, the first and second systems may be entities that store and/or have access to health-related information of a number of members. The first and second systems may be interested in predicting a certain health-related outcome, such as, for example, a likelihood that a member will be hospitalized. The environment 600 depicted in FIG. 6 shows a first system 602 and a second system 604. The first system 602 may include the same or similar components and perform the same or similar operations as the first system 102 from FIG. 1. The second system 604 may include the same or similar components and perform the same or similar operations as the second system 104 and/or the third system 106 from FIG. 1.

In one example, the first system 602 may include a sample-data generator 618, which may have been identified and/or generated by the first system 602 or may have been received from the second system 604. The second system 604 may include a sample-data generator 622, which may have been identified and/or generated by the second system 604 or may have been received from the first system 602.

The sample-data generator 618 may be configured to access data records, which may be referred to as host data 606(*a*) from a database and generate new data having some of the same or similar features as the data record but without other features. For example, a host data 606(*a*) may include features such as patient name, patient address, blood pressure values, blood sugar values, and patient age. The sample-data generator 618 may be configured to accept the host data 606(a) and generate sample data 608(a) having some of the same features, such as blood pressure values, blood sugar values, and patient age, while not including other features, such as patient name and patient address. The data discriminator 620 may be configured to receive sample data 608(a) generated by the sample-data generator 618 and analyze that sample data 608(a) to determine whether the sample data 608(b) was received from the sample-data generator 618 or from the database storing the host data 606(a).

The sample-data generator 618 may be sent from the first system 602 to the second system 604 having access to different data and/or located in a different location than the first system 602. The sample-data generator 618 may be configured to access data records associated with the second system 604 and generate sample data 608(b) using the sample-data generator 622. In examples, differences between the sample data 608(b) and host data 606(b) accessible to the second system 604 may be determined by the data discriminator 624, which may cause the data discriminator 624 to determine that the sample data 608(b) is received from the sample-data generator 622 instead of the data storage that stores the host data 606(a). The identified differences may be utilized by the data discriminator 624, the sample-data generator 622, and/or one or more other components of the system 604 to train the sample-data generator 622. For example, the sample-data generator 622 may be altered and/or updated such that the generated sample data has fewer differences than sample data generated before training. This process may be repeated until the data discriminator 624 cannot determine whether sample data 608(b) is received from the sample-data generator 622 or the data storage where the host data 606(b) is stored. In examples, the process may be repeated until the difference between the sample data 608(b) and the host data 606(b) is less than a threshold difference level. It should be understood that while a threshold difference level is described herein, the data discriminator 622 may continue to operate until a measure of statistical difference between sample data and data records reaches a predefined minimum, or in other words, until the sample data is sufficiently similar to the data records.

Once the sample-data generator 618, 622 has been trained, the trained sample-data generator 614(a), 614(b), may be sent from the first system 602 to the second system 604 and/or from the second system 604 to the first system 602. In other words, the sample-data generators may be trained using one system's data and then may be sent from that system to one or more other systems. The first system 602, for example, having received the trained sample-data generator 614(b), may then utilize the sample-data generator 614(b) to generate statistically-representative data 616(a) associated with the second system 604. The statistically-representative data 616(a) may be stored in the same or a separate database, such as the data storage, as the data records associated with the first system 602 and may be utilized by one or more components of the first system 602. Likewise, the second system 604, having received the trained sample-data generator 614(a), may utilize the sample-data generator 614(a) to generate statistically-representative data 616(b) associated with the first system 602.

A predictive model 610(a), 610(b) may be generated and/or received, which may be trained based at least in part on the host data 606(a), 606(b) and/or the statistically-representative sample data 608(a), 608(b). The predictive models 610(a), 610(b) may then utilized to determine an outcome 612(a), 612(b) and/or determine a probability of an outcome 612(a), 612(b) occurring, as described more fully with respect to FIG. 1.

It should be understood that while the first system 602 and the second system 604 have been described herein as having host data 606(a), 606(b), one or more of the systems may not have host data and may not require host data to participate in the processes described herein. For example, the second system 604 may receive the trained sample-data generator 614(a) from the first system 602 and may utilize the trained sample-data generator 614(a) to generate statistically-representative data 616(b) of the first system 602. In these examples, a system may define a population set and may utilize the statistically-representative data that is relevant to that population set for one or more applications, such as predicting an outcome. Additionally, or alternatively, if permitted, an interface may be provided to the second system 604 to access a database of the statistically-representative data 616(b) as generated by the trained sample-data generator 614(a).

As sample-data generators are trained (such as sample-data generators 618, 622), the trained sample-data generators (such as trained sample-generators 614(a), 614(b)) and/or the data discriminators (such as data discriminators 620, 624) may be stored in a supervisory layer 626 as well as the types of data associated with each trained sample-data generator and data discriminator. For example, the supervisory layer 626 may store the sample-generator 618 and data discriminators 620 generated by the first system 602 and data types associated with the first system 602. Additionally, the supervisory layer 626 may store the sample-generator 622 and data discriminators 624 generated by the second system 604 and data types associated with the second system 604. As discussed above with respect to FIGS. 1-5, the supervisory layer 626 may determine to provide certain trained sample-data generators and/or data discriminators as inputs to particular systems in order to improve the accuracy of an outcome associated with a predictive layer and improve the efficiency with which the outcome is generated.

Figure 7:
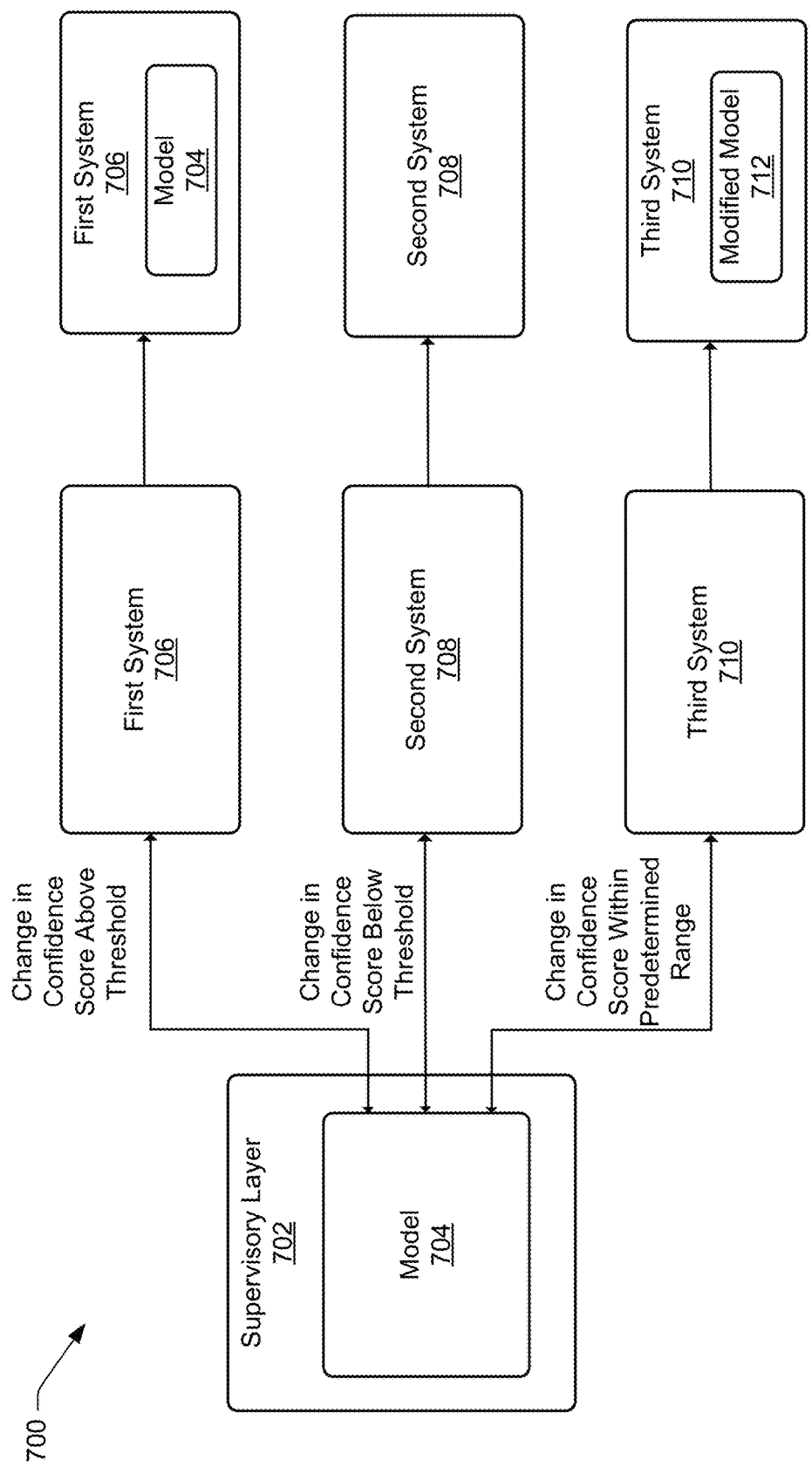
FIG. 7 a conceptual diagram of example components of three systems interacting with a supervisory layer.

FIG. 7 illustrates a conceptual diagram of example components and data of multiple systems storing siloed and/or sharable data and a supervisory layer facilitating model exchange based on a change in a confidence score. The environment 700 depicted in FIG. 7 shows a supervisory layer 702, a model 704, a first system 706, a second system 708, and a third system 710. The supervisory layer 702 may be included in any one of the first system 706, the second system 708, or the third system 710. In some cases, the supervisory layer 702 may operate on a separate server remote from the other systems. The first system 706 may include the same or similar components and perform the same or similar operations as the first system 102 from FIG. 1. The second system 708 may include the same or similar components and perform the same or similar operations as the second system 104 from FIG. 1. The third system 710 may include the same or similar components and perform the same or similar operations as the third system 106 from FIG. 1. The supervisory layer 702 may determine a change in a degree of a confidence score associated with an outcome occurring based at least in part on utilizing the model 704 as an input to a predictive layer of each of the first system 706, the second system 708, or the third system 710. For example, the supervisory layer 702 may utilize a machine learning model to determine if including the model 704 into the predictive layer of the first system 706 would increase the ability and/or accuracy of predicting a given outcome. For example, an outcome may be associated with a confidence score determined by the supervisory layer 702. If a change in the confidence score is above a threshold (e.g., the confidence score increases), then the supervisory layer 702 may provide the model 704 to the first system 706 to be utilized in the predictive layer of the first system 706. In another example, the supervisory layer 702 may calculate a confidence score associated with an outcome from a predictive layer associated with the second system 708 utilizing the model 704 as an input. In this case, if the change in the confidence score drops below a threshold amount, the supervisory layer 702 may not provide the model 704 to the second system 708. In another example, the supervisory layer 702 may calculate a confidence score associated with an outcome from a predictive layer associated with the third system 710 utilizing the model 704 as an input. In this case, if the change in the confidence score is within a predetermined range, the supervisory layer 702 may not provide the model 704 to the third system 710, but rather, generate a modified model 712 to be provided to the third system 710. The modified model 712 may include data types selected by the supervisory layer 702 that are different than the data types included in the model 704 and that result in an increased confidence score of the outcome generated by the predictive layer of the third system 710. In this way, the supervisory layer 702 can determine which models to provide the systems in order to increase the ability and/or accuracy of predicting a given outcome.

Figure 9:
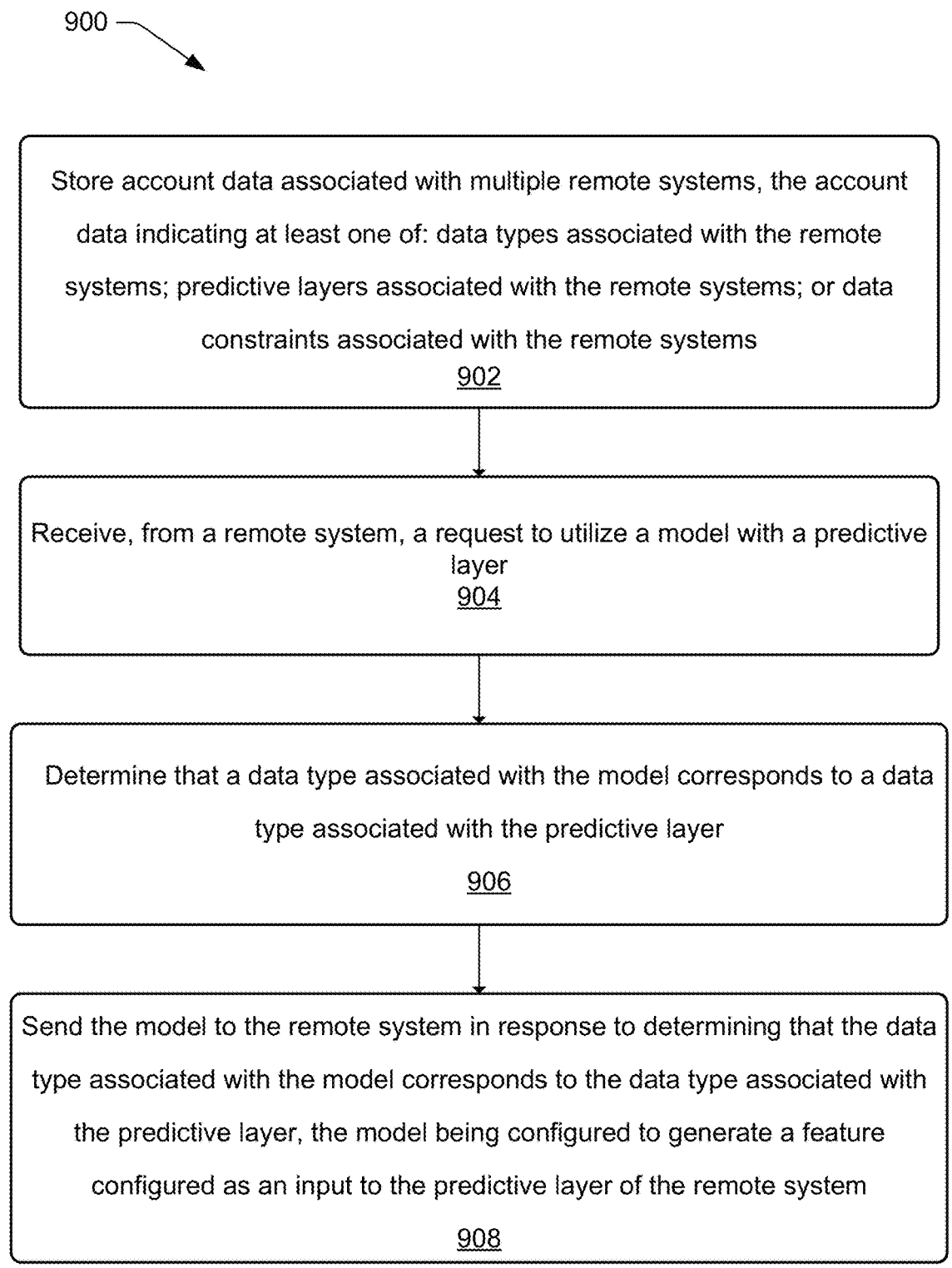
FIG. 9 illustrates a flow diagram of another example process for supervising model exchange.
Figure 10:
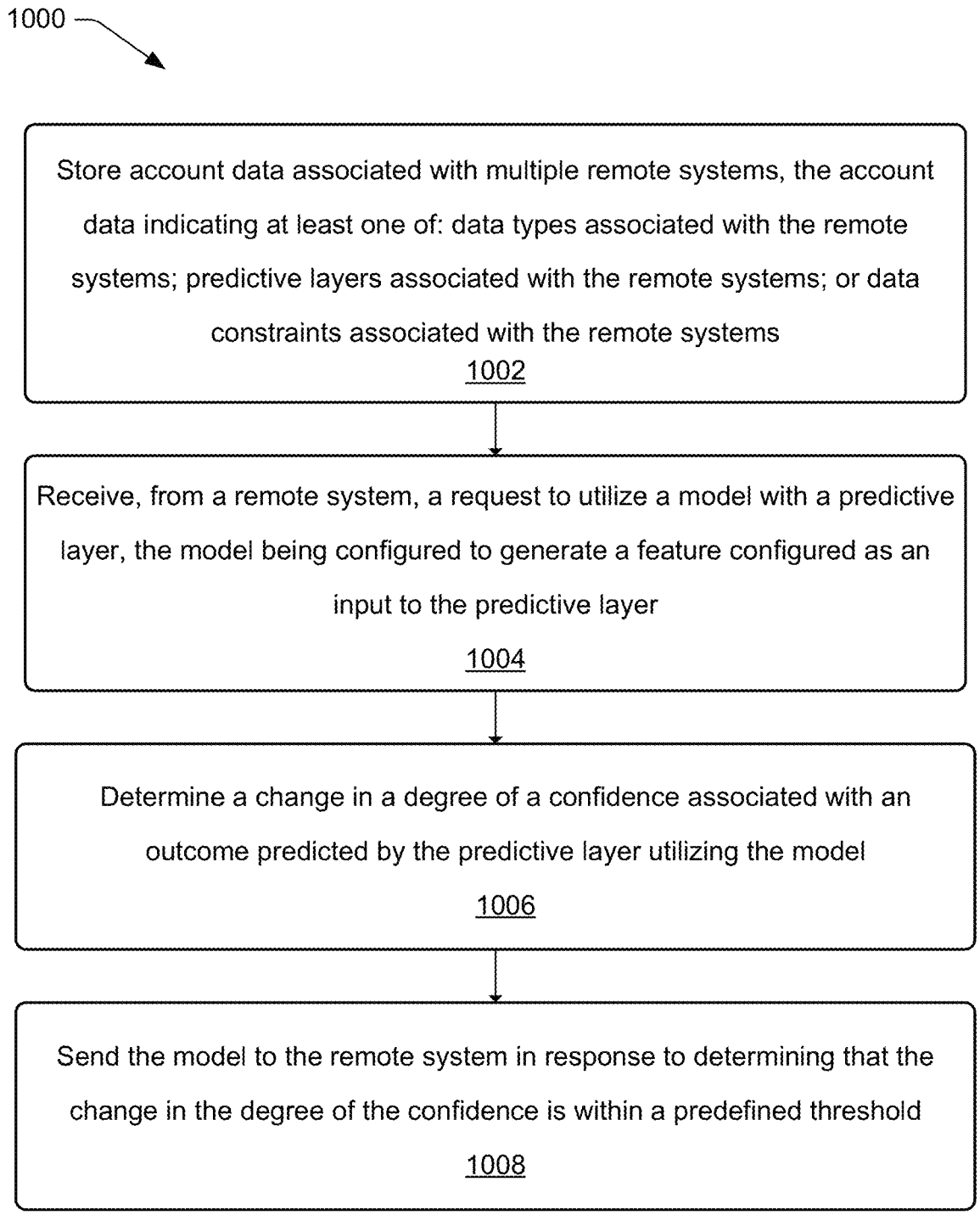
FIG. 10 illustrates a flow diagram of another example process for supervising model exchange.

FIGS. 8-10 illustrate various processes for determining and sending models for utilizing siloed data. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-7, although the processes may be implemented in a wide variety of other environments, architectures and systems.

FIG. 8 illustrates a flow diagram of an example process 800 for determining a model to send to a remote system. The order in which the operations or steps are described is not intended to be construed as a limitation, and any number of the described operations may be combined in any order and/or in parallel to implement process 800.

At block 802, the process 800 may include storing account data associated with multiple remote systems, the account data indicating at least one of: data types associated with the remote systems; predictive layers associated with the remote systems; or data constraints associated with the remote systems. For example, once a model is generated, the supervisory layer 318 may store the model and any information associated with the model (e.g., data types associated with the model, predictive layers associated with the system that generated the model, etc.) as well as information associated with each system (e.g., data types associated with each system, predictive layers, outcomes associated with predictive layers, data constraints associated with each system, etc.). As shown in FIG. 3, the supervisory layer 318 may store a model 330 that is associated with the first data type 308(*a*) and the second data type 310(*a*), a model 332 that is associated with the second data type 310(*a*), and a model 334 that is associated with the third data type 312.

At block 804, the process 800 may include receiving, from a remote system, a request to utilize a model with a predictive layer. For example, using FIG. 1 as an example, the second system 104 and the third system 106 may request a model from the first system 102. The request, and/or other information available to the first system 102, may indicate the data and/or data types to be utilized by the second system 104 and by the third system 106.

At block 806, the process 800 may include determining a condition to account for in association with providing the model to the remote system, the factor including at least one of: a change in a degree of a confidence score associated with an outcome predicted by the predictive layer utilizing the model; or a data type associated with the model corresponding to a data type associated with the predictive layer. For example, the first system 302 may receive a request for a model from the second system 304. The supervisory layer 318 of the first system 302 may determine that the model 330 may be fit for the predictive layer 322 of the second system 304 based at least in part on overlapping data types between the model 330 and the second system 304. For example, the supervisory layer 318 may store system data indicating which data types are available to the systems. Using the system data, a determination may be made as to the data types available to the second system 304 that are also associated with the model 330, here illustrated as the first data type 308(*a*)-(*b*) and the second data type 310(*a*)-(*b*). The model 330 configured to utilize data of the overlapping data types may be selected by the supervisory layer 318 to be provided to the predictive layer 322 of the second system 304. In examples, the supervisory layer 318 may utilize the model 330 to predict an outcome using the data of the second system 304 of the common data types.

In some examples, the supervisory layer 318 may determine which model to provide the second system 304 or the third system 306 based on a confidence score of an outcome associated with the model and/or the feature generated by the model being used as an input in the predictive layer 322 and/or the predictive layer 326. For example, a predictive power component may be configured to determine a change in the predicted outcome, such as, for example, an increase or decrease in a probability of the outcome occurring, based on utilizing a feature from a model. For example, some features may have a large impact on determining the outcome based at least in part on the amount of data available to the system running the model, the accuracy of the model, etc. When determining if certain systems should utilize a particular model, the supervisory layer 318 may be configured to utilize the predictive power component to determine an amount of change of the probability of the outcome occurring based at least in part on utilizing the feature as an input. In examples, when the amount of change is greater than a threshold amount, such as, for example, a 1% increase, the feature may be utilized as an input for the predictive model of the particular system. In other examples where the amount of change is less than the threshold amount, the feature may be disregarded. In still other examples, the feature may result in a negative change to the outcome probability, and in these examples, the feature may be disregarded.

At block 808, the process 800 may include sending the model to the remote system based at least in part on the condition being satisfied. For example, the supervisory layer may send the model 330 to the second system 304 in response to determining that including the model and/or feature generated by the model improves the confidence score of the outcome or based at least in part on overlapping data types between the model 330 and the second system 304.

FIG. 9 illustrates a flow diagram of an example process 900 for determining a model to send to a remote system. The order in which the operations or steps are described is not intended to be construed as a limitation, and any number of the described operations may be combined in any order and/or in parallel to implement process 900.

At block 902, the process 900 may include storing account data associated with multiple remote systems, the account data indicating at least one of: data types associated with the remote systems; predictive layers associated with the remote systems; or data constraints associated with the remote systems. For example, once a model is generated, the supervisory layer 318 may store the model and any information associated with the model (e.g., data types associated with the model, predictive layers associated with the system that generated the model, etc.) as well as information associated with each system (e.g., data types associated with each system, outcomes associated with predictive layers, data constraints associated with each system, etc.). As shown in FIG. 3, the supervisory layer 318 may store a model 330 that is associated with the first data type 308(a) and the second data type 310(a), a model 332 that is associated with the second data type 310(a), and a model 334 that is associated with the third data type 312.

At block 904, the process 900 may include receiving, from a remote system, a request to utilize a model with a predictive layer. For example, using FIG. 1 as an example, the second system 104 and the third system 106 may request a model from the first system 102. The request, and/or other information available to the first system 102, may indicate the data and/or data types to be utilized by the second system 104 and by the third system 106.

At block 906, the process 900 may include determining that a data type associated with the model corresponds to a data type associated with the predictive layer. For example, the first system 302 may receive a request for a model from the second system 304. The supervisory layer 318 of the first system 302 may determine that the model 330 may be fit for the predictive layer 322 of the second system 304 based at least in part on overlapping data types between the model 330 and the second system 304. For example, the supervisory layer 318 may store system data indicating which data types are available to the systems. Using the system data, a determination may be made as to the data types available to the second system 304 that are also associated with the model 330, here illustrated as the first data type 308(a)-(b) and the second data type 310(a)-(b). The model 330 configured to utilize data of the overlapping data types may be selected by the supervisory layer 318 to be provided to the predictive layer 322 of the second system 304. In examples, the supervisory layer 318 may utilize the model 330 to predict an outcome using the data of the second system 304 of the common data types.

At block 908, the process 900 may include sending the model to the remote system in response to determining that the data type associated with the model corresponds to the data type associated with the predictive layer, the model being configured to generate a feature configured as an input to the predictive layer of the remote system. For example, the supervisory layer may send the model 330 to the second system 304 based at least in part on overlapping data types between the model 330 and the second system 304.

FIG. 10 illustrates a flow diagram of an example process 1000 for determining a model to send to a remote system. The order in which the operations or steps are described is not intended to be construed as a limitation, and any number of the described operations may be combined in any order and/or in parallel to implement process 1000.

At block 1002, the process 1000 may include storing account data associated with multiple remote systems, the account data indicating at least one of: data types associated with the remote systems; predictive layers associated with the remote systems; or data constraints associated with the remote systems. For example, once a model is generated, the supervisory layer 318 may store the model and any information associated with the model (e.g., data types associated with the model, predictive layers associated with the system that generated the model, etc.) as well as information associated with each system (e.g., data types associated with each system, outcomes associated with predictive layers, data constraints associated with each system, etc.). As shown in FIG. 3, the supervisory layer 318 may store a model 330 that is associated with the first data type 308(a) and the second data type 310(a), a model 332 that is associated with the second data type 310(a), and a model 334 that is associated with the third data type 312.

At block 1004, the process 1000 may include receiving, from a remote system, a request to utilize a model with a predictive layer, the model being configured to generate a feature configured as an input to the predictive layer. For example, using FIG. 1 as an example, the second system 104 and the third system 106 may request a model from the first system 102. The request, and/or other information available to the first system 102, may indicate the data and/or data types to be utilized by the second system 104 and by the third system 106.

At block 1006, the process 1000 may include determining a change in a degree of a confidence score associated with an outcome predicted by the predictive layer utilizing the model. For example, the supervisory layer 318 may determine which model to provide the second system 304 or the third system 306 based on a confidence score of an outcome associated with the model and/or the feature generated by the model being used as an input in the predictive layer 322 and/or the predictive layer 326. For example, a predictive power component may be configured to determine a change in the predicted outcome, such as, for example, an increase or decrease in a probability of the outcome occurring, based on utilizing a feature from a model. For example, some features may have a large impact on determining the outcome based at least in part on the amount of data available to the system running the model, the accuracy of the model, etc. When determining if certain systems should utilize a particular model, the supervisory layer 318 may be configured to utilize the predictive power component to determine an amount of change of the probability of the outcome occurring based at least in part on utilizing the feature as an input. In examples, when the amount of change is greater than a threshold amount, such as, for example, a 1% increase, the feature may be utilized as an input for the predictive model of the particular system. In other examples where the amount of change is less than the threshold amount, the feature may be disregarded. In still other examples, the feature may result in a negative change to the outcome probability, and in these examples, the feature may be disregarded.

At block 1008, the process 1000 may include sending the model to the remote system in response to determining that the change in the degree of the confidence is within a predefined threshold. For example, the supervisory layer may send the model 330 to the second system 304 in response to determining that including the model and/or feature generated by the model improves the confidence score of the outcome.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
computer-readable media storing computer-executable instructions that, when executed by the one or more processors, cause the one or more processors to perform operations comprising:
storing account data associated with multiple remote systems, the account data indicating at least one of:
data types associated with the remote systems;
predictive layers associated with the remote systems; or
data constraints associated with the remote systems;
receiving, from a remote system, a request to utilize a model with a predictive layer, wherein the model is configured in a first language and the remote system is configured in a second language;
determining a mapping between the first language and the second language;
determining to provide the remote system with the model based at least in part on the mapping;
determining a condition to account for in association with providing the model to the remote system, the condition including at least one of:
a change in a degree of a confidence score associated with an outcome predicted by the predictive layer utilizing the model; or
a data type associated with the model corresponding to a data type associated with the predictive layer; and
sending the model to the remote system based at least in part on the condition being satisfied.

2. The system of claim 1, further comprising configuring the model based at least in part on the data types associated with the remote systems.

3. The system of claim 1, further comprising determining an additional condition to account for in association with providing the model to an additional remote system and sending a notification to the additional remote system indicating that the model is available in response to the additional condition being satisfied.

4. The system of claim 1, further comprising a graphical user interface (GUI) and presenting, via the GUI, a status of a plurality of models associated with the multiple remote systems.

5. The system of claim 1, further comprising accessing a database storing data associated with the remote system and generating an API based on the data associated with the remote system.

6. The system of claim 5, further comprising sending the API to the remote system, wherein the model is provided to the remote system via the API.

7. The system of claim 6, further comprising determining information to surface on a device associated with the remote system via the API based at least in part on historical data associated with the first data type and the second data type.

8. A system comprising:
one or more processors; and
computer-readable media storing first computer-executable instructions that, when executed by the one or more processors, cause the one or more processors to perform operations comprising:
storing account data associated with multiple remote systems, the account data indicating at least one of:
data types associated with the remote systems;
predictive layers associated with the remote systems; or
data constraints associated with the remote systems;
receiving, from a remote system, a request to utilize a model with a predictive layer, wherein the model is configured in a first language and the remote system is configured in a second language;
determining a mapping between the first language and the second language;
determining to provide the remote system with the model based at least in part on the mapping;
determining that a data type associated with the model corresponds to a data type associated with the predictive layer; and
sending the model to the remote system in response to determining that the data type associated with the model corresponds to the data type associated with the predictive layer, the model being configured to generate a feature configured as an input to the predictive layer of the remote system.

9. The system of claim 8, further comprising receiving an indication of an outcome that the predictive layer is configured to determine and configuring the model to correspond to the outcome prior to sending.

10. The system of claim 8, further comprising configuring the model based at least in part on the data types associated with the remote systems.

11. The system of claim 8, further comprising determining an additional condition to account for in association with providing the model to an additional remote system and sending a notification to the additional remote system indicating that the model is available in response to the additional condition being satisfied.

12. The system of claim 8, further comprising a graphical user interface (GUI) and presenting, via the GUI, a status of a plurality of models associated with the multiple remote systems.

13. The system of claim 8, further comprising:
determining an outcome that occurs based at least in part on utilizing the feature as in input to the predictive layer;
determining a confidence associated with determining whether the outcome occurs based at least in part on utilizing the feature as an input to the predictive layer;
determining that the confidence satisfies a threshold confidence; and
providing the model to the remote system in response to determining that the confidence satisfies the threshold confidence.

14. A method comprising:
storing account data associated with multiple remote systems, the account data indicating at least one of:
data types associated with the remote systems;
predictive layers associated with the remote systems; or
data constraints associated with the remote systems;
receiving, from a remote system, a request to utilize a model with a predictive layer, the model being configured to generate a feature configured as an input to the predictive layer, wherein the model is configured in a first language and the remote system is configured in a second language;
determining a mapping between the first language and the second language;
determining to provide the remote system with the model based at least in part on the mapping;
determining a change in a degree of a confidence associated with an outcome predicted by the predictive layer utilizing the model; and
sending the model to the remote system in response to determining that the change in the degree of the confidence is within a predefined threshold.

15. The method of claim 14, further comprising configuring the model based at least in part on the data types associated with the remote systems.

16. The method of claim 14, further comprising determining an additional condition to account for in association with providing the model to an additional remote system and sending a notification to the additional remote system indicating that the model is available in response to the additional condition being satisfied.

17. The method of claim 16, further sending an application programming interface (API) to the remote system, wherein the model is provided to the remote system via the API.

18. The method of claim 17, further comprising determining information to surface on a device associated with the remote system via the API based at least in part on historical data associated with the first data type and the second data type.

19. The method of claim 14, further comprising determining that the confidence is greater than a threshold confidence and providing the model to the remote system in response to determining that the confidence being greater than the threshold confidence.

20. The method of claim 14, further comprising presenting, via a graphical user interface (GUI), a status of a plurality of models associated with the multiple remote systems.

* * * * *